United States Patent [19]
Kim

[11] Patent Number: 5,963,619
[45] Date of Patent: Oct. 5, 1999

[54] EXTERNAL INCOMING CALL SWITCHING METHOD IN AUTOMATIC ANSWERING TELEPHONE SUBSCRIBED IN INCOMING CALL SWITCHING SERVICE

[75] Inventor: Yoon-Hyang Kim, Gumi, Rep. of Korea

[73] Assignee: SamSung Electronics Co., Ltd., Kyungki-do, Rep. of Korea

[21] Appl. No.: 08/742,123

[22] Filed: Oct. 31, 1996

[30] Foreign Application Priority Data

Oct. 31, 1995 [KR] Rep. of Korea ............ 95-38733

[51] Int. Cl.[6] .................... H04M 1/65; H04M 3/54
[52] U.S. Cl. ............................. 379/88.23; 379/211
[58] Field of Search .................. 379/67, 79, 74, 379/77, 210, 211, 212, 379, 88.16, 88.22, 88.23, 88.24

[56] References Cited

U.S. PATENT DOCUMENTS

| | | |
|---|---|---|
| 4,066,848 | 1/1978 | Darwood ................... 379/379 |
| 4,670,628 | 6/1987 | Boratgis et al. ............ 379/211 |
| 4,768,221 | 8/1988 | Green et al. ............... 379/211 |
| 4,878,243 | 10/1989 | Hashimoto ................ 379/211 |
| 4,893,335 | 1/1990 | Fuller et al. .............. 379/212 |
| 5,077,789 | 12/1991 | Clark, Jr. et al. ........... 379/211 |
| 5,249,221 | 9/1993 | Ketring ................... 379/211 |
| 5,289,528 | 2/1994 | Ueno et al. ................ 379/67 |
| 5,502,762 | 3/1996 | Andrew et al. ............. 379/211 |
| 5,533,104 | 7/1996 | Weiss et al. ............... 379/211 |
| 5,553,129 | 9/1996 | Partridge, III ............. 379/211 |
| 5,610,970 | 3/1997 | Fuller et al. .............. 379/210 |

*Primary Examiner*—Daniel S. Hunter
*Attorney, Agent, or Firm*—Robert E. Bushnell, Esq.

[57] ABSTRACT

A method for offering an incoming call switching service automatically in an automatic telephone answering system by remotely registering a telephone number of a desired destination using a remote telephone system. Therefore, the telephone number of the desired destination need not be registered directly. Moreover, since the incoming call is switched only during a predetermined time period, the telephone system can be used outside of the incoming call switching service conveniently even when the user forgets to set the incoming call switching function.

20 Claims, 5 Drawing Sheets

EXTERNAL INCOMING CALL SWITCHING METHOD IN AUTOMATIC ANSWERING TELEPHONE SUBSCRIBED IN INCOMING CALL SWITCHING SERVICE

CROSS-REFERENCE TO RELATED APPLICATION

This application makes reference to, incorporates the same herein, and claims all benefits accruing under 35 U.S.C. §119 from an application for *External Incoming Call Switching Method In Automatic Answering Telephone Subscribed In Incoming Call Switching Service* earlier filed in the Korean Industrial Property Office on Oct. 31, 1995, and there duly assigned Ser. No. 38733/1995.

BACKGROUND OF THE INVENTION

1. Technical Field

The present invention relates to an automatic answering telephone system, and more particularly, relates to a method of offering an incoming call switching service in an automatic answering telephone system automatically by registering a telephone number of a desired destination using another telephone system.

2. Background Art

Generally, telephone systems are capable of automatically answering a telephone call and recording a caller's message accordingly. Some telephone systems such as disclosed in U.S. Pat. No. 4,608,458 for *Automatic Telephone Answering Apparatus* issued to Hashimoto, are further constructed to respond to an incoming telephone call by playing back a pre-recorded voice message greeting a caller and requesting for the caller's name for voice amplification via a loudspeaker so that the user can decide whether to answer the telephone call. An automatic telephone answering mechanism for such a telephone system is typically intended to play a pre-recorded voice message greeting a caller upon reception of an incoming telephone call and then to allow the user to play back a caller's message at some later time. The caller's message which is recorded in the absence of the user, may then be forwarded to a registered transfer destination by automatic dialing as disclosed in U.S. Pat. No. 5,289,528 for *Automatic Telephone Answering Apparatus With Call Forwarding Arrangement* issued to Ueno et al., so as to alert the user of the incoming telephone call. Other telephone systems such as disclosed in U.S. Pat. No. 5,533,104 for *Telephone Answering Device And Method* issued to Weiss, alternatively allows the user to switch an incoming telephone call from the caller to a message recording or answering machine after the user has initially spoken to the caller. The automatic telephone answering scheme with its pre-recorded greetings are cost effective solutions to the unattended or unanswered telephone call. Many callers, however, refuse to talk to a machine. When an incoming telephone call is unanswered by the user particularly in today's business environment, a business opportunity may be lost.

One solution to this problem is to transfer the incoming telephone call to a registered transfer destination where the user can respond to the telephone call directly by automatic dialing as disclosed in U.S. Pat. No. 5,249,221 for *Telephone Answering System With Call Transfer* issued to Ketring. Generally, an incoming call switching service is provided by an exchange system as administered, for example, by the Korea Telephone and Telecommunication to allow an incoming telephone call to be received by another telephone system located in the same communication area and subscribed to such service. When the incoming telephone call is to be switched or transferred to a registered transfer destination by the exchange system, the incoming telephone call switching function of the telephone system must be physically set by the user and the transfer destination must be directly registered by the user. That is, if the user leaves his telephone system without setting the incoming telephone call switching function, he or she must return to his or her telephone system so as to register the call switching function to be offered to callers. Moreover, if the incoming call switching service is to be canceled, the user must also return to his or her telephone system to cancel the call switching function previously registered in the telephone system. This requirement, as I have observed, is extremely burdensome.

SUMMARY OF THE INVENTION

Accordingly, it is therefore an object of the present invention to provide an improved automatic telephone answering system and process.

It is also an object to provide an automatic telephone answering system for allowing a user to remotely set a call switching function from which an incoming telephone call switching service is offered to a caller so that an incoming telephone call can be automatically received by another telephone system.

It is another object to provide an automatic telephone answering system for allowing a user to remotely register a telephone number of a desired destination for an incoming call, i.e., an incoming call switching number at an exchange system supporting an incoming telephone call switching service so that all future incoming calls are switched to the registered incoming call switching number.

It is yet another object to provide an automatic telephone answering system for allowing a user to remotely register an incoming call switching time in addition to a telephone number of a desired destination for an incoming call, i.e., an incoming call switching number at an exchange system supporting an incoming telephone call switching service so that all future incoming calls are switched to the registered incoming call switching number only during an incoming call switching time period.

These and other objects of the present invention can be achieved by a method of offering an incoming call switching service in an exchange system including steps of forming an electro-optical (electrical or optical) speech path upon detection of an incoming call from a caller via a telephone line; automatically sending an answering message to the caller to inform the caller available modes of operation including to record a voice message in said telephone system, and to remotely control registration of a telephone number of a desired destination for the incoming call switching service in a remote control mode; when the caller selects the remote control mode to remotely control registration of the telephone number of the desired destination, sending a mode selection guide message to the caller to inform the caller selection of an incoming call switching mode; when the caller selects the incoming call switching mode, sending a registration guide message to the caller to request registration of the telephone number of the desired destination; when the caller registers the telephone number of the desired destination, storing a switching service code corresponding to registered telephone number of the desired destination in the telephone system for the incoming call switching service; and automatically dialing the switching service code containing the registered telephone number of the desired destination corresponding to an incoming call switching service to register the same registered telephone number of the desired destination at the exchange system so that all incoming calls can be switched by the exchange system to the registered telephone number of the desired destination.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
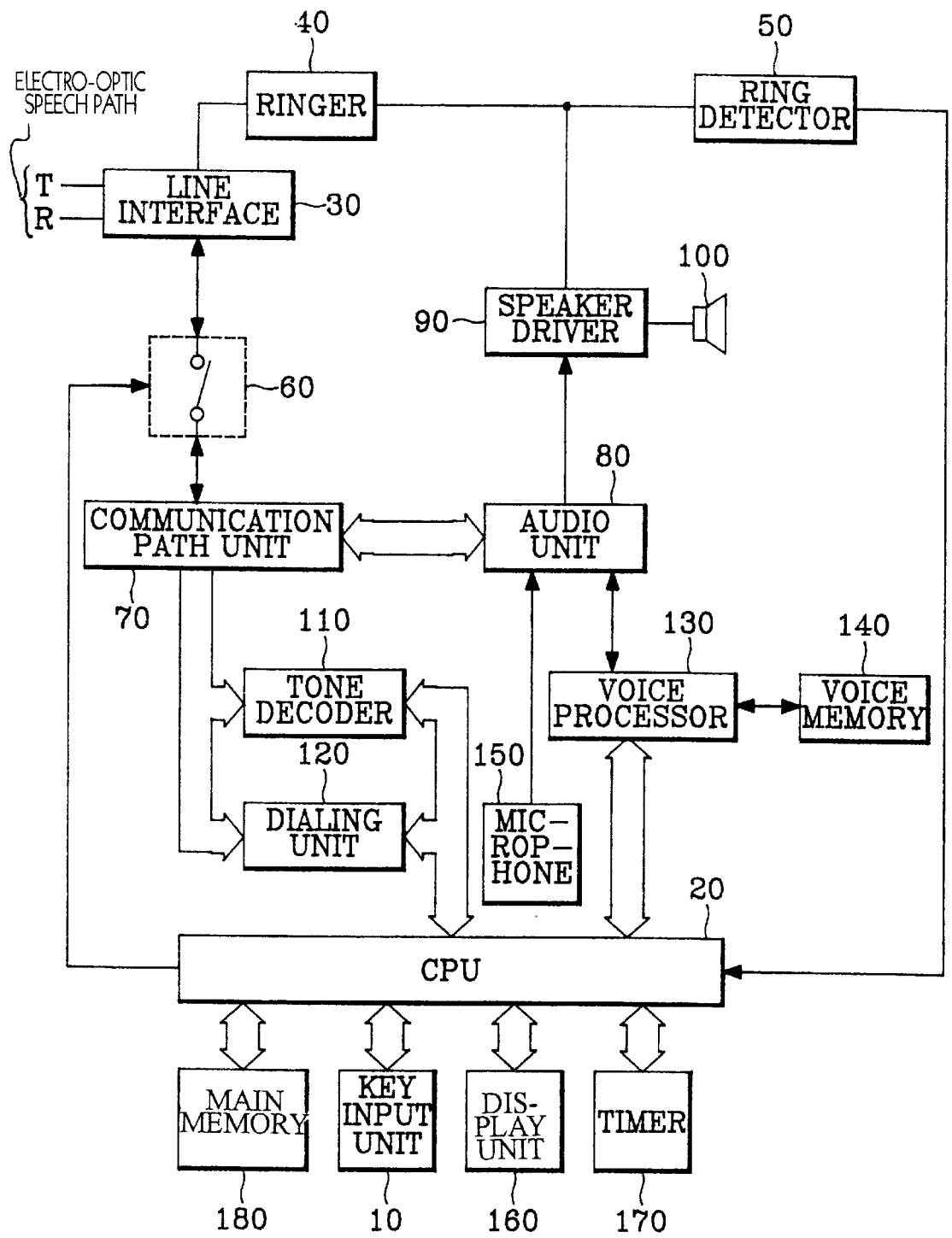
FIG. 1 is a block diagram of an automatic telephone answering system constructed according to the principles of the present invention.

Referring now to the drawings and particularly to FIG. 1, which illustrates an automatic telephone answering system constructed according to the principles of the present invention. This automatic answering telephone system includes a key input unit 10, a central processing unit (CPU) 20 for controlling operation of the telephone, a line interface 30 connected to a tip and ring terminal of a telephone line, a ringer 40, a ring detector 50, a switch 60, a communication path unit 70, an audio unit 80, a speaker driver 90 for driving a speaker 100, a tone decoder 110, a dialing unit 120, a voice processor 130, a voice memory 140, a microphone 150, display unit 160, a timer 170 and a main memory 180.

The key input unit 10 allows the user or subscriber to generate key commands and key data for controlling the operation of the telephone. The line interface 30 is connected to the PSTN via the telephone line to interface a ring signal between the telephone and PSTN, a tone signal and voice signals. The ring detector 50 is connected to the ringer 40 to detect the ring signal received through the line interface 30. The voice memory 140 is connected to the CPU 20 via the voice processor 130 to store guide messages and subject messages recorded by the user to allow registration of a telephone number of a desired destination for offering the incoming telephone call switch service. The CPU 20 controls the incoming telephone call switch service to switch an incoming telephone call upon reception of various key signals received from the key input unit 10. A loop relay 60 is controlled by the control signal of the CPU 20 to switch a voice communication path between the telephone and PSTN. A communication path unit 70 is connected to the loop relay 60 to form an electro-optical speech path with a caller in response to a ring signal indicative of an incoming call, and process a voice signal and a tone signal during a hook-off state. An audio unit 80 is connected to the communication path unit 70 to receive a voice signal from the PSTN or receiving and processing a voice message. A voice processor 130 is controlled by the control signal of the CPU 20 to audio-synthesize the guide message signal stored in the voice memory 140 to output the same to the audio unit 80, and a display unit 160 is controlled by the control signal of the CPU 20 to display various operational states of the telephone.

Figure 2A:
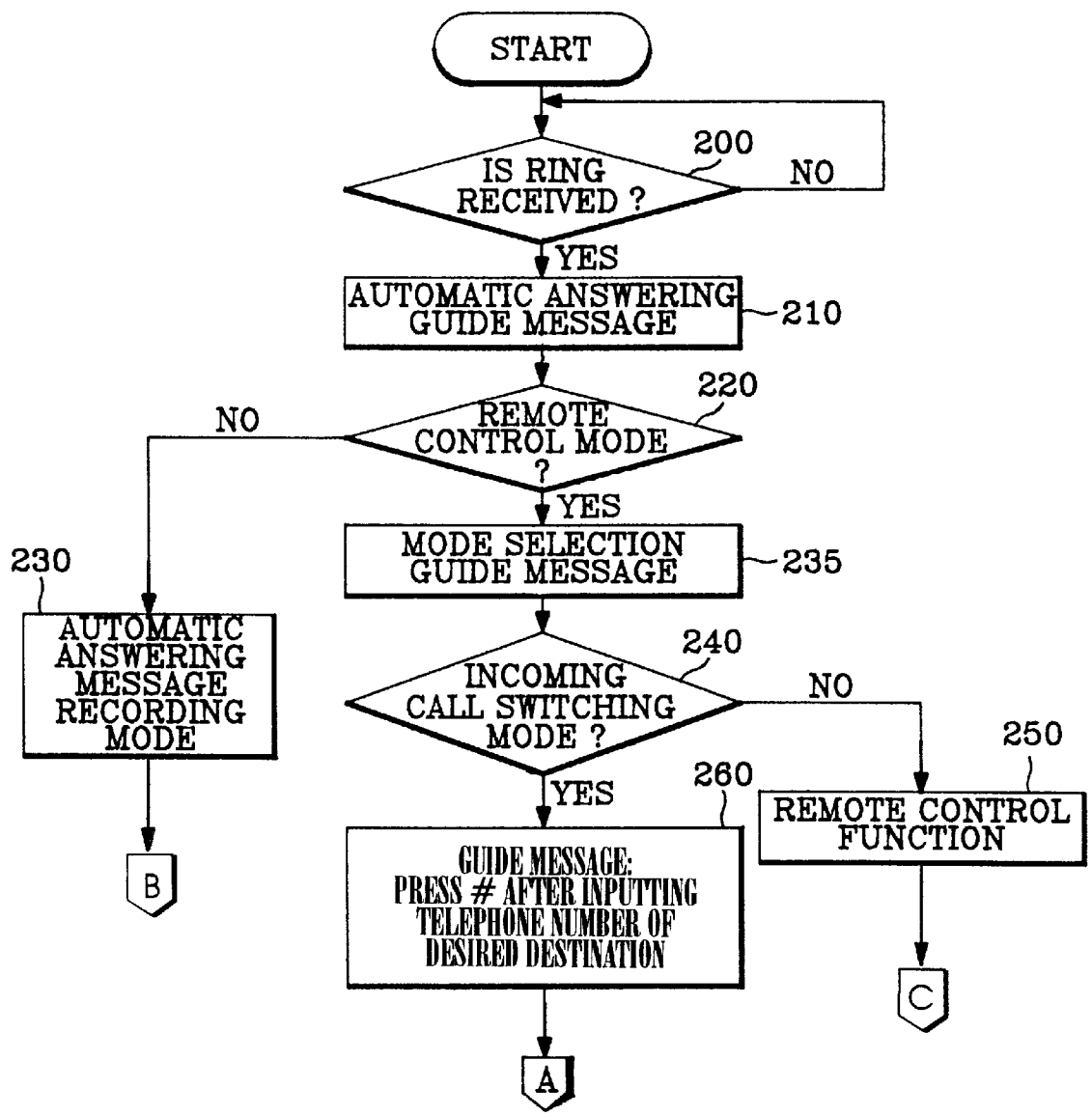
FIGS. 2A and 2B are flow charts illustrating a process of registering a telephone number of a desired destination from a remote telephone system according to the principles of the present invention.
Figure 2B:
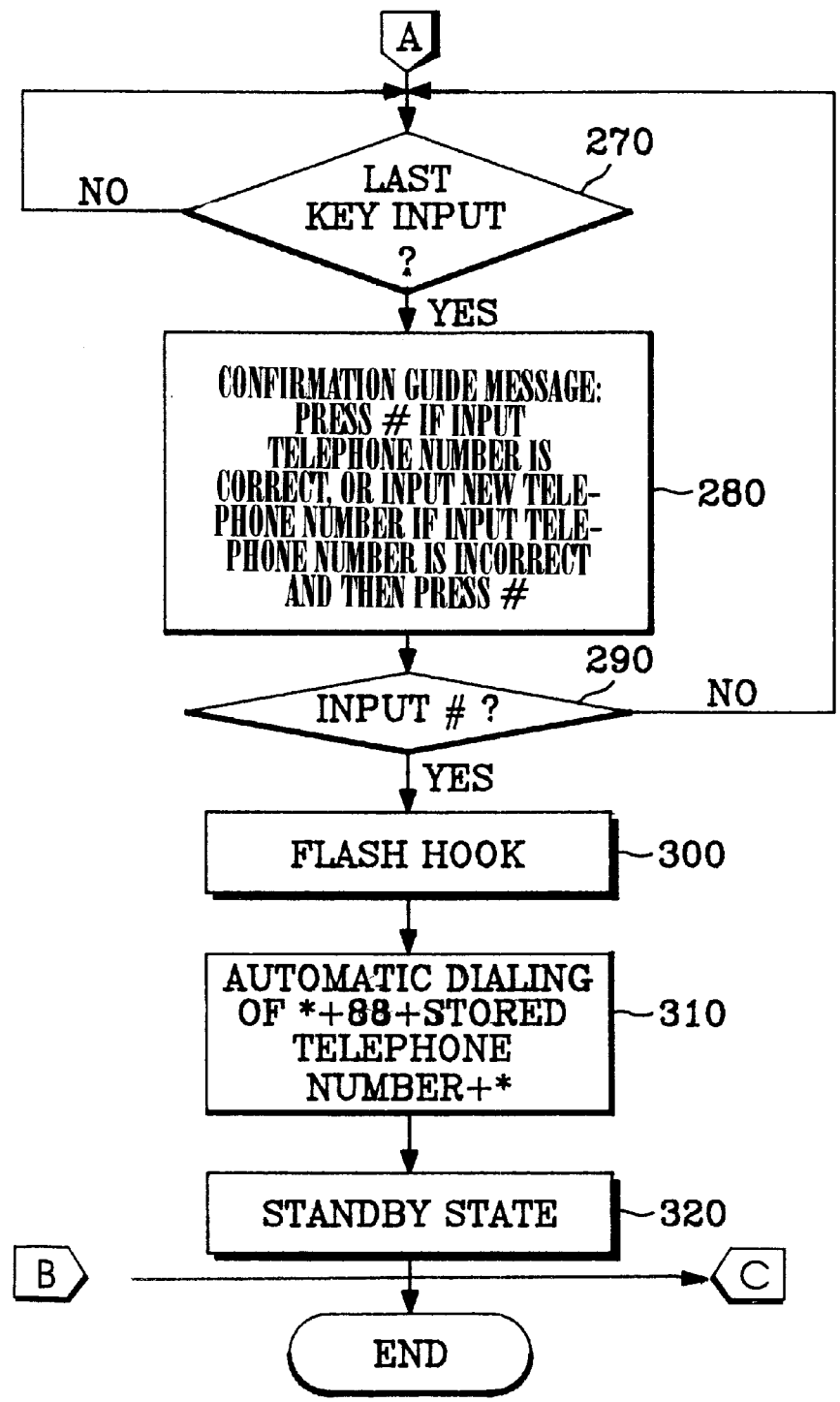

FIGS. 2A and 2B are flow charts illustrating a process of registering a telephone number of a desired destination in an automatic telephone answering system and an exchange system supporting an incoming call switching service from an external remote telephone system according to the principles of the present invention. The process requires steps of primarily detecting receipt of an incoming telephone call from a user, transmitting an automatic answering message upon receipt of the incoming telephone call and generating a mode selection guide message to the user for selection of various modes when a remote control mode is detected from the key input upon transmission of the automatic answering message, secondly detecting whether an incoming call switching mode is detected from the key input, allowing the caller to register a telephone number of a desired destination, i.e., an incoming call switching number, when the incoming call switching mode is detected from the key input, and then automatically dialing a service code corresponding to an incoming call switching service to register the same incoming call switching number in the exchange system so that all incoming calls can be switched by the exchange system to the registered incoming call switching number.

Figure 3A:
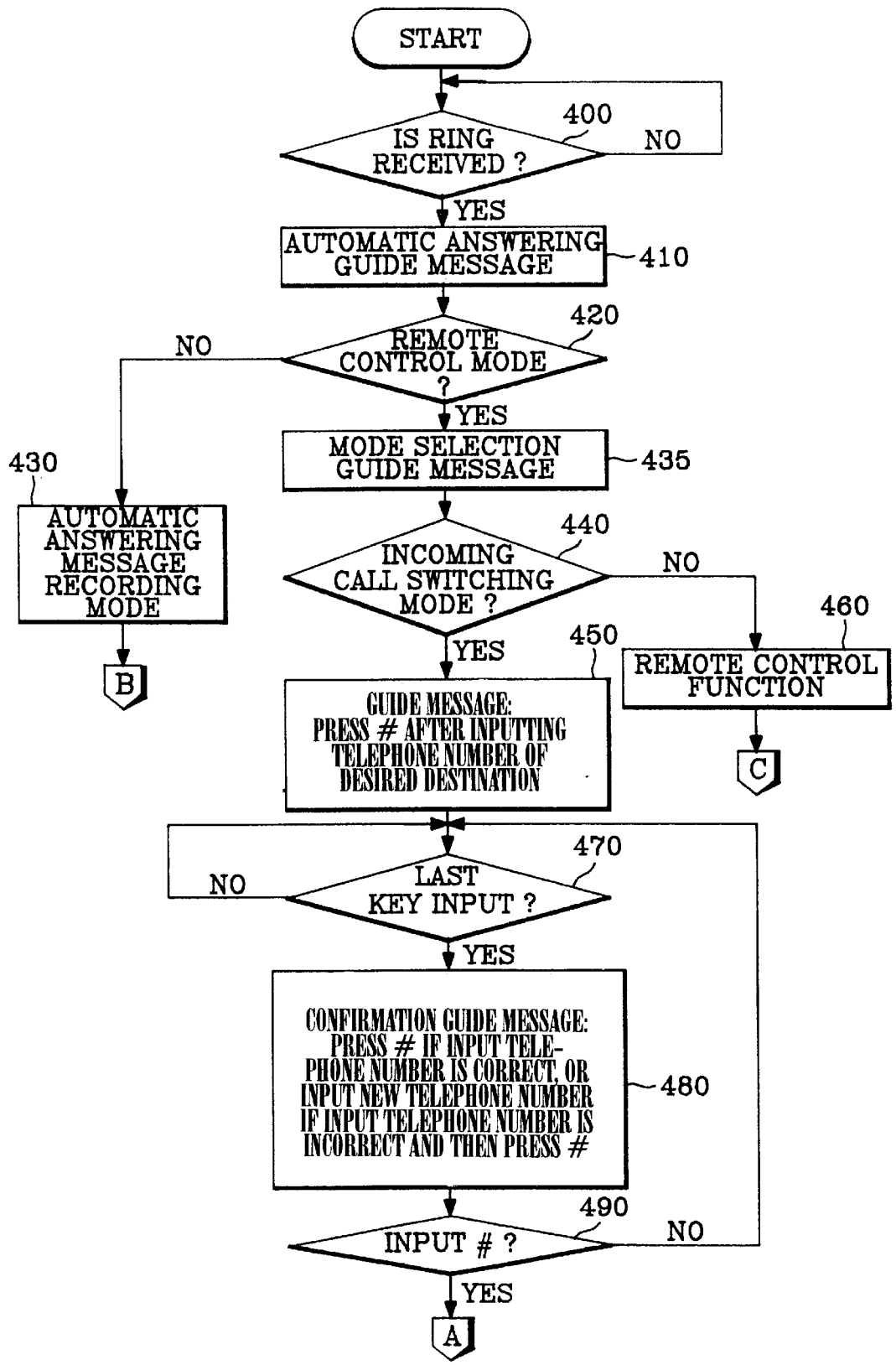
FIGS. 3A and 3B are flow charts illustrating a process of registering a telephone number of a desired destination and an incoming call switching mode cancellation time from a remote telephone system according to the principles of the present invention.
Figure 3B:
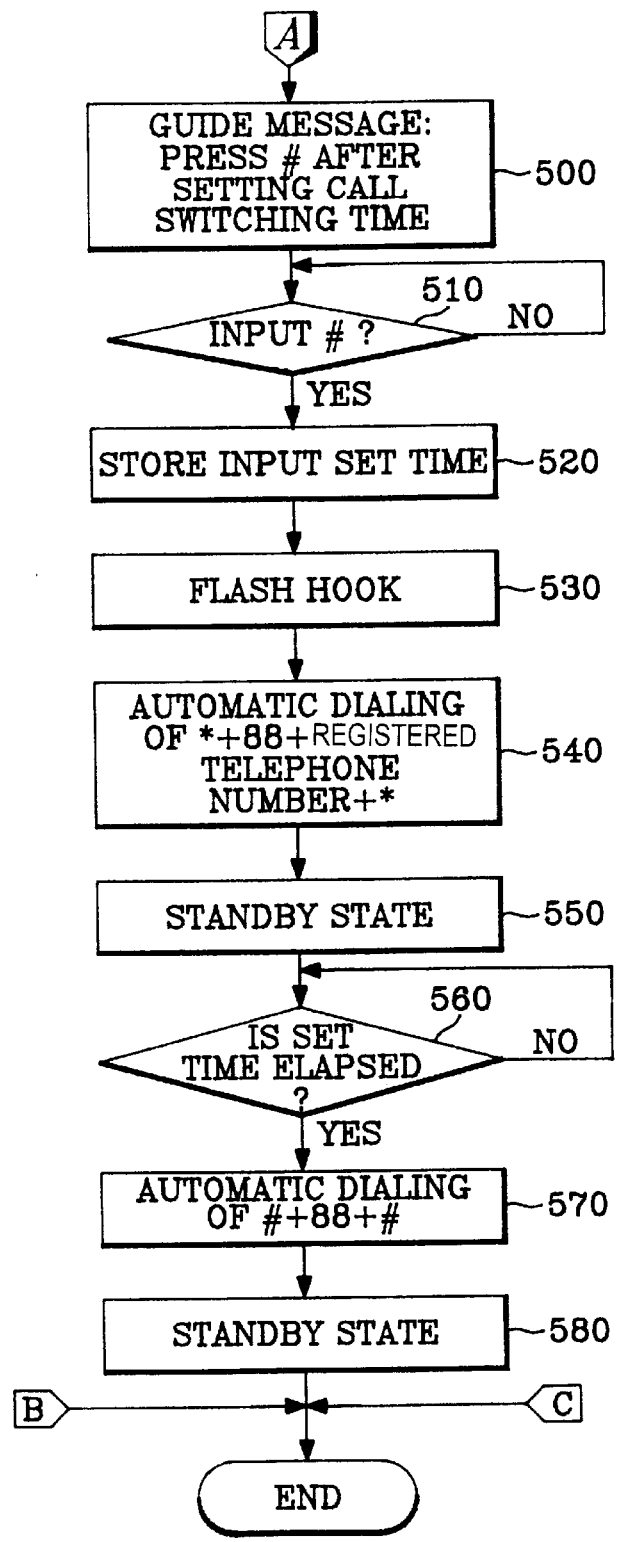

FIGS. 3A and 3B illustrates a process of registering incoming telephone call switching mode canceling time from an external telephone system according to the principles of the present invention. The process requires steps of primarily detecting receipt of an incoming telephone call from a user, transmitting an automatic answering message upon receipt of the incoming telephone call and primarily generating a mode selection guide message to the user for selection of various modes when a remote control mode is detected from the key input upon transmission of the automatic answering message, secondly detecting whether an incoming call switching mode is detected from the key input, allowing the user to register a telephone number of a desired destination, i.e., an incoming call switching number, when the incoming call switching mode is detected from the key input, secondly generating a guide message for the setting of an incoming call switching mode canceling time, allowing the user to register a predetermined time as an incoming call switching mode canceling time, and automatically dialing a service code corresponding to an incoming call switching service to register the same registered telephone number of the desired destination and the predetermined time at the exchange system so that all incoming calls can be switched by the exchange system to the registered telephone number of the desired destination only during a predetermined time period.

Hereinbelow, the automatic telephone answering system as subscribed to an incoming call switching service and constructed according to the principles of the present invention will be described in detail with reference to FIG. 1 and FIGS. 2A, 2B, 3A and 3B as follows.

First, the CPU 20 detects whether a ring signal representing an incoming telephone call is received from a caller, i.e., the subscriber or user who desires to remotely set his or her telephone system to perform an incoming telephone call switching function, through the ring detector 50 at step 200 shown in FIG. 2A. Thereafter, the CPU 20 forms an electro-optical speech path with the caller generates a control signal to the voice processor 130 at step 210, to allow an automatic answering message recorded in the voice memory 140 to be read and synthesized as a voice signal and is then transmitted to the caller via the audio unit 80 and the speaker 100. At this time, if a key is input from the caller's remote telephone system during the transmission of the automatic answering message, the CPU 20 determines whether the input key value represents a remote control mode. If the input key value does not represent the remote control mode at step 220, the telephone system is placed in an automatic answering message recording mode to allow recording of the caller's voice message at step 230. At this time, the automatic answering message recording mode is well known and therefore further explanation will be omitted herein. However, if the input key value represents the remote control mode at step 220, a mode selection guide message as previously recorded in the voice memory 140 is read and synthesized as a voice signal and is then transmitted to the caller via the audio unit 80 and speaker 100 at step 235. When the mode selection guide message is recognized by the caller and a key value is input from the caller, the CPU 20 determines whether the input key value represents an incoming call switching mode at step 235. At this time, if the input key value does not represent the incoming call switching mode, the CPU 20 allows the telephone system to perform other corresponding remote control functions at step 250. However, if the incoming call switching mode is selected by the caller, the CPU 20 generates a control signal to the audio processor 130 at step 260 to allow a signal indicative of a guide message such as "Please press button # after inputting a telephone number of a desired destination" stored in the voice memory 140 to be read and synthesized as a voice signal and then transmitted to the caller via the audio unit 80 and speaker 100.

Thereafter, when the caller recognizes the guide message and inputs a telephone number of his or her desired destination, i.e., an incoming call switching number, the CPU 20 determines whether the input key value represents the last key value "#" at step 270 as shown in FIG. 2B. Then, the CPU 20 generates a control signal to the audio processor 130 at step 280 to allow a signal indicative of a confirmation guide message such as "Please press button # if the input telephone number is correct, or input a new telephone number if the input telephone number is incorrect and then press button #" stored in the voice memory 140 to be read and synthesized as a voice signal and then be transmitted to the caller via the audio unit 80 and speaker 100. Thereafter, if the caller recognizes the guide message and inputs the corresponding code, the CPU 20 determines whether the input key value is the last key value of a "#" signal at step 290. At this time, if the input key value is not the "#" signal, the CPU 20 returns to step 270 to wait for the input of the "#" signal. After the input of the "#" signal is detected at step 290, a hook switch is controlled by the CPU 20 to flash a hook at step 300, that is, to place the telephone system in a temporary reservation state to change a communication path by way of an internal software. Then, the CPU 20 automatically dials an incoming call switching service code containing the input incoming call switching number so as to register the same input incoming call switching number at the exchange system for supporting the incoming call switching service at step 310. At this time, the type of the automatically dialed service code is "*+88+a telephone number of a desired destination +*". Thereafter, the telephone system is placed in a standby state at step 320 and then the registration program is terminated. After the input incoming call switching number is registered at the exchange system supporting the incoming call switching service by the user who subscribes to this service, all incoming calls will be switched or forwarded to the registered incoming call switching number.

Turning now to FIGS. 3A and 3B which illustrate a process of registering an incoming call switching mode cancellation time for canceling an incoming call switching service automatically from a remote telephone system. The registration of the incoming telephone call switching mode cancellation time is optically provided after the telephone number of a desired destination is registered at an exchange system in the same manner as illustrated in FIGS. 2A and 2B. That is, when a ring signal representing an incoming telephone call is received from the caller via a telephone line at step 400 shown in FIG. 3A, an automatic answering guide message is transmitted to the caller at step 410. After the automatic answering guide message is transmitted to the caller at step 410, the CPU 20 determines whether a key input from the caller represents a remote control mode at step 420. If the key input from the caller does not represent the remote control mode at step 420, the CPU 20 places the telephone system in an automatic answering message recording mode to allow the caller to record his or her voice messages in a conventional manner at step 430. However, when the key input from the caller represents the remote control mode at step 420, a mode selection guide message is transmitted to the caller at step 435 to allow the caller to select an incoming call switching mode. If the key input from the caller does not represent the incoming call switching mode at step 440, the CPU 20 allows the telephone system to perform a different remote control function as instructed by the caller at step 460.

When the key input from the caller represents the incoming call switching mode at step 440, however, a guide message such as "Please press # after inputting a telephone number of a desired destination" is transmitted to the caller for requesting an incoming call switching service at step 450. After the last key input is detected from the caller at step 470, a confirmation guide message such as "Please press button # if the input telephone number is correct, or input a new telephone number if the input telephone number is incorrect and then press button #" at step 480. The CPU 20 then determines whether the button # is input from the caller at step 490. Steps 400 to 490 are performed in the same manner as illustrated in steps 200 to 290 as shown in FIGS. 2A and 2B. However, after the button # is input from the caller at step 490, a call switching time guide message such as "Please press # after setting an incoming call switching time" is additionally transmitted to the caller for setting an incoming telephone call switching mode cancellation time for canceling an incoming call switching service automatically at step 500. That is, the CPU 20 generates a control signal to the voice processor 130 at step 500 to allow a signal indicative of the incoming call switching time guide message stored in the voice memory 140 to be read and synthesized as a voice signal and be transmitted to the caller via the audio unit 80 and speaker 100.

Thereafter, if the caller recognizes the guide message and inputs the set time, the CPU 20 determines at step 510 whether the input key value is the last key value "#". At this time, if the input of the "#" signal is detected, the CPU 20 stores the input set time in the memory 180 at step 520. Then, a hook switch is controlled to flash a hook, that is, to place the telephone system in a temporary reservation state to change a communication path by way of an internal software. The CPU 20 then automatically dials an incoming call switching service code containing the input incoming call switching number so as to register the same input incoming call switching number at the exchange system for supporting the incoming call switching service at step 540. At this time, the type of the automatically dialed service code is "*+88+a telephone number of a desired destination+*". Thereafter, the telephone system is placed in a standby state at step 550 and then a timer is checked as to whether a set time for canceling an incoming call switching service is elapsed at step 560. If the set time is elapsed, the CPU 20 automatically dials an incoming call switching service cancellation code of "#88#" so as to register the same set time at the exchange system for canceling the incoming call switching service at step 570. Thereafter, the telephone system is placed in a standby state at step 580 and the registration program is terminated. As a result, if an incoming call switching time is set for canceling an incoming call switching service after the input incoming call switching number is registered at the exchange system by the user who subscribes to this service, all incoming calls will be switched or forwarded by the exchange system to the registered incoming call switching number only during a predetermined time period.

As described above, the present invention provides an automatic answering telephone system capable of offering an incoming call switching service automatically after allowing the user to register a telephone number of a desired destination via a remote telephone. Therefore, the user need not register the telephone number of a desired destination directly on the telephone system. In addition, since the incoming call is switched only during a predetermined time period, the telephone system can be used outside of the incoming call switching service conveniently even when the user forgets to set the incoming call switching function.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the appended claims. In the claims, means-plus-function clause are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method for offering an incoming call switching service in a telephone system subscribed to an incoming call switching system provided by an exchange system, comprising the steps of:

forming an electro-optical speech path upon detection of an incoming call from a caller via a telephone line;

automatically sending an answering message to the caller to inform the caller available modes of operation including to record a voice message in said telephone system, and to remotely control registration of a telephone number of a desired destination for an incoming call in a remote control mode;

when the caller selects the remote control mode to remotely control registration of the telephone number of said desired destination, sending a mode selection guide message to the caller to inform the caller selection of an incoming call switching mode;

when the caller selects the incoming call switching mode, sending a registration guide message to the caller to request input of the telephone number of said desired destination;

when the caller inputs the telephone number of said desired destination, storing the input telephone number of said desired destination in said telephone system; and automatically dialing a service code corresponding to an incoming call switching service to register a stored telephone number of said desired destination at said exchange system for enabling said exchange system to automatically switch all future incoming calls received by said telephone system to a registered telephone number of said desired destination.

2. The method of claim 1, further recording the voice message from the caller, when the caller does not select the remote control mode.

3. The method of claim 1, further performing a corresponding remote control function, when the caller does not select the incoming call switching mode.

4. The method of claim 1, further comprised of said service code corresponding to *+88+the input telephone number of said desired destination+*.

5. The method of claim 1, further comprised of said caller representing a user who desires to remotely set said telephone system to perform the incoming call switching service.

6. A method for registering a telephone number of a desired destination and an incoming call switching cancellation time through a telephone system subscribed to an incoming call switching service provided by an exchange system, said method comprising the steps of:

forming an electro-optical speech path upon detection of an incoming call from a caller via a telephone line;

automatically sending an answering message to the caller to inform the caller available modes of operation including to record a voice message in said telephone system, and to remotely control registration of a telephone number of a desired destination for an incoming call in a remote control mode;

when the caller selects the remote control mode to remotely control registration of the telephone number of said desired destination, sending a mode selection guide message to the caller to inform the caller selection of an incoming call switching mode;

when the caller selects the incoming call switching mode, sending a registration guide message to the caller to request registration of the telephone number of said desired destination;

when the caller inputs the telephone number of said desired destination, storing an input telephone number of said desired destination in said telephone system;

sending a call switching time guide message to the caller to request input of the incoming call switching cancellation time;

when the caller inputs the incoming call switching cancellation time of a predetermined period, storing an input set time in said telephone system;

automatically dialing a service code corresponding to an incoming call switching service to register the input telephone number of said desired destination at said exchange system for enabling said exchange system to automatically switch all future incoming calls received by said telephone system to the registered telephone number of said desired destination; and automatically dialing a service cancellation code requesting cancellation of said incoming call switching service to register the input set time at said exchange system for enabling said exchange system to automatically switch all future incoming calls received by said telephone system to the registered telephone number of said desired destination only during a predetermined period.

7. The method of claim 6, further recording the voice message from the caller, when the caller does not select the remote control mode.

8. The method of claim 6, further performing a corresponding remote control function, when the caller does not select the incoming call switching mode.

9. The method of claim 6, further comprised of said service code corresponding to *+88+input telephone number of said desired destination +*.

10. The method of claim 6, further comprised of said service cancellation code for canceling said incoming call switching service corresponding to #+88+#.

11. The method of claim 6, further comprising the steps of:

driving a timer for said predetermined period after the set time is input by the caller; and automatically dialing said service cancellation code for canceling said incoming call switching service when said predetermined time has elapsed.

12. The method of claim 11, further comprised of said service cancellation code for canceling said incoming call switching service corresponding to #+88+#.

13. A telephone system subscribed to an incoming call switching service provided by an exchange system, comprising:

a memory for storing therein an answering message to respond to an incoming call from a caller via a telephone line, and a plurality of guide messages to guide the caller to control registration of a telephone number of a desired destination for offering an incoming call switching service;

means for detecting the incoming call from the caller via said telephone line; and a controller for controlling a remote registration of the telephone number of said desired destination by:
forming an electro-optical speech path upon detection of an incoming call from the caller;
automatically sending an answering message to the caller to inform the caller available modes of operation including to record a voice message in said telephone system, and to remotely control registration of a telephone number of a desired destination for an incoming call in a remote control mode;
when the caller selects the remote control mode to remotely control registration of the telephone number of said desired destination, sending a mode selection guide message to the caller to inform the caller selection of an incoming call switching mode;
when the caller selects the incoming call switching mode, sending a registration guide message to the caller to request input of the telephone number of said desired destination;
when the caller inputs the telephone number of said desired destination, storing the input telephone number of said desired destination in said memory; and
automatically dialing a service code corresponding to an incoming call switching service to register a stored telephone number of said desired destination at said exchange system for enabling said exchange system to automatically switch all future incoming calls to be received by said telephone system to a registered telephone number of said desired destination.

14. The telephone system of claim 13, further comprised of said controller recording the voice message from the caller in said memory, when the caller does not select the remote control mode.

15. The telephone system of claim 13, further comprised of said controller performing a corresponding remote control function, when the caller does not select the incoming call switching mode.

16. The telephone system of claim 13, further comprised of said service code corresponding to *+88+input telephone number of said desired destination +*.

17. The telephone system of claim 13, further comprised of said controller allowing the caller to register an incoming call switching cancellation time at said exchange system through said telephone system for enabling said exchange system to automatically switch all future incoming calls received by said telephone system to the registered telephone number of said desired destination only during a predetermined period.

18. The telephone system of claim 13, further comprised of said controller further sending a message to the caller to request input of a call switching cancellation time, and after said call switching cancellation time is input, automatically dialing a service cancellation code requesting said exchange system to automatically switch all future incoming calls received by said telephone system to the registered telephone number of said desired destination only during a predetermined period, said service cancellation code corresponding to #+88+#.

19. The telephone system of claim 13, further comprised of said controller storing an input set time in said memory when the caller inputs a call switching cancellation time, and automatically dialing a service cancellation code requesting cancellation of said incoming call switching service for enabling said exchange system to automatically switch all future incoming calls received by said telephone system to the registered telephone number of said desired destination only during a predetermined time period.

20. The telephone system of claim 19, further comprised of said service cancellation code for canceling said incoming call switching service corresponding to #+88+#.

* * * * *